US008002660B2

(12) United States Patent
Kato

(10) Patent No.: US 8,002,660 B2
(45) Date of Patent: Aug. 23, 2011

(54) VEHICULAR AUTOMATIC TRANSMISSION

(75) Inventor: Naoki Kato, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 702 days.

(21) Appl. No.: 11/663,288

(22) PCT Filed: Jun. 1, 2006

(86) PCT No.: PCT/JP2006/311458
§ 371 (c)(1),
(2), (4) Date: Jul. 8, 2008

(87) PCT Pub. No.: WO2007/013225
PCT Pub. Date: Feb. 1, 2007

(65) Prior Publication Data
US 2009/0082155 A1 Mar. 26, 2009

(30) Foreign Application Priority Data
Jul. 25, 2005 (JP) .................................. 2005-213750

(51) Int. Cl.
*F16H 57/04* (2010.01)
(52) U.S. Cl. ....................................................... 475/159
(58) Field of Classification Search .................. 475/159, 475/160
See application file for complete search history.

(56) References Cited

U.S. PATENT DOCUMENTS

| 2,238,746 | A | * | 4/1941 | Neracher et al. ............... 477/118 |
| 2,782,658 | A | * | 2/1957 | Schaefer et al. ................. 477/54 |
| 3,038,353 | A | * | 6/1962 | Roche .............................. 477/61 |
| 3,053,115 | A | | 9/1962 | Bert et al. |
| 4,328,716 | A | * | 5/1982 | Ahlen et al. ................... 475/145 |
| 5,230,664 | A | | 7/1993 | Michioka et al. |
| 6,110,069 | A | | 8/2000 | Taniguchi et al. |
| 6,120,410 | A | | 9/2000 | Taniguchi et al. |
| 6,135,912 | A | | 10/2000 | Tsukamoto et al. |

FOREIGN PATENT DOCUMENTS

EP 0 722 056 A2 7/1996
(Continued)

OTHER PUBLICATIONS

Office Action issued Jul. 27, 2010, in Japanese Patent Application No. 2005-213750 (with English translation).

(Continued)

*Primary Examiner* — Ha D. Ho
(74) *Attorney, Agent, or Firm* — Oblon, Spivak, McClelland, Maier & Neustadt, L.L.P.

(57) ABSTRACT

A vehicular automatic transmission including first and second shafts coaxially splined to each other at their adjacent axial end portions, and a lubrication system including: first and second lubrication passages formed through the respective first and second shafts in their axial direction, in communication with each other through the adjacent axial end portions, oil outlet holes in communication with the lubrication passages and spaced apart from each other in the axial direction, and first and second oil inlet holes formed through the respective first and second rotary shafts such that the oil outlet holes are located between the oil inlet holes and the adjacent axial end portions of the shafts, so that lubricating oil introduced into the lubrication passages through the respective oil inlet holes flows through the lubrication passages toward the adjacent axial end portions of the shafts.

8 Claims, 4 Drawing Sheets

FOREIGN PATENT DOCUMENTS

| | | |
|---|---|---|
| EP | 1 167 832 | 1/2002 |
| EP | 1 666 766 | 6/2006 |
| JP | 61 45171 | 3/1986 |
| JP | 2-103559 | 8/1990 |
| JP | 7 47985 | 5/1995 |
| JP | 08-021520 | 1/1996 |
| JP | 2000-220705 | 8/2000 |
| JP | 2001-349342 | 12/2001 |
| JP | 2002-13619 | 1/2002 |
| WO | 2005 026579 | 3/2005 |

OTHER PUBLICATIONS

Japanese Office Action (with partial English translation) issued on Feb. 15, 2011, in counterpart Japanese Patent Application No. 2005-213750 (5 pages).

\* cited by examiner

|  | C1 | C2 | C3 | C4 | B1 | B2 | F1 |
|---|---|---|---|---|---|---|---|
| P |  |  |  |  |  |  |  |
| Rev1 |  | O |  |  |  | O |  |
| Rev2 | O |  |  |  |  | O |  |
| N |  |  |  |  |  |  |  |
| 1st |  |  | O |  |  | (O) | O |
| 2nd |  |  | O |  | O |  |  |
| 3rd |  | O | O |  |  |  |  |
| 4th | O |  | O |  |  |  |  |
| 5th |  |  | O | O |  |  |  |
| 6th | O |  |  | O |  |  |  |
| 7th |  | O |  | O |  |  |  |
| 8th |  |  |  | O | O |  |  |

O : ENGAGED STATE

VEHICULAR AUTOMATIC TRANSMISSION

TECHNICAL FIELD

The present invention relates in general to construction of an automatic transmission, and more particularly to a lubrication system incorporated in an automatic transmission for efficient supply of a lubricating oil to lubricated parts of the automatic transmission.

BACKGROUND ART

There is known a vehicular automatic transmission of a type including two rotary shafts which are coaxial with each other and which are splined to each other at their adjacent axial end portions to be rotated together. This automatic transmission has a lubrication system having lubrication passages formed through the two rotary shafts so as to extend in their axial direction. The lubrication passages in the two rotary shafts are held in communication with each other at the spline-connected adjacent axial end portions. A lubricating oil is introduced into the lubrication passages through an oil inlet hole formed at one of the opposite axial ends of one of the two rotary shafts rotated together. The lubrication system further has a plurality of oil outlet holes from which the lubricating oil is fed out from the lubrication passages to various lubricated parts of the automatic transmission. JP-7-47985 B2 discloses such a lubrication system for a vehicular automatic transmission, which permits improved lubricating efficiency.

In the automatic transmission of the type described above, there exists a gap between the spline teeth formed in the splined-connected adjacent axial end portions of the two rotary shafts, so that the lubricating oil flows from the lubrication passages through this gap. This flow of the lubricating oil through the gap causes a loss of the lubricating oil for the lubricated parts corresponding to one of the two rotary shafts which is not provided with the inlet indicated above. Accordingly, the amount of the lubricating oil to be fed to those lubricated parts tends to be insufficient. This problem is solved by providing the spline-connected adjacent axial end portions of the two rotary shafts with a suitable sealing device arranged to prevent the oil flow through the gap between the spline teeth. However, the provision of the sealing device requires a support structure for holding the sealing member, which undesirably increases the size and number of components of the vehicular automatic transmission, and accordingly increases the number of manufacturing process steps and the cost of manufacture of the automatic transmission.

DISCLOSURE OF THE INVENTION

The present invention was made in view of the background art described above. It is an object of this invention to provide a vehicular automatic transmission which includes two coaxial rotary shafts splined to each other at their adjacent axial end portions, and which permits efficient lubrication of all of its lubricated parts with a sufficient amount of lubricating oil, without an undesirable increase in the size and number of components of the automatic transmission.

The object indicated above may be achieved according to the principle of the present invention, which provides a vehicular automatic transmission comprising a first rotary shaft and a second rotary shaft which are coaxial with each other and which are splined to each other at their adjacent axial end portions to be rotated together, and a lubrication system having a first lubrication passage and a second lubrication passage which are respectively formed through the first and second rotary shafts in so as to extend in an axial direction of the rotary shafts and which are held in communication with each other through the adjacent axial end portions, the lubrication system further having a plurality of oil outlet holes which are held in communication with the first and second lubrication passages and which are spaced apart from each other in the axial direction, so that a lubricating oil introduced into the first and second lubrication passages are delivered through the oil outlet holes radially outwardly of the first and second shafts, to corresponding lubricated parts of the automatic transmission, the vehicular automatic transmission being characterized in that the lubrication system further has a first oil inlet hole and a second oil inlet hole formed through the first and second rotary shafts, respectively, such that the plurality of oil outlet holes are located between the first and second oil inlet holes and the adjacent axial end portions of the first and second rotary shafts, so that the lubricating oil introduced into the first and second lubrication passages through the respective first and second oil inlet holes flows through the first and second lubrication passages toward the adjacent axial end portions.

In the vehicular automatic transmission of the present invention constructed as described above, the lubricating oil is introduced into the first and second lubrication passages through the respective first and second oil inlet holes formed through the respective first and second rotary shafts which are rotated together, such that the plurality of oil outlet holes which are formed through the first and second rotary shafts and which correspond to the plurality of lubricated parts are located between the first and second oil inlet holes and the splined-connected adjacent axial end portions of the first and second shafts, so that the lubricating oil introduced into the first and second lubrication passages through the respective first and second oil inlet holes flow through the lubrication passages toward the spline-connected adjacent axial end portions, whereby the lubricated parts can be lubricated by the lubricating oil delivered from the corresponding oil outlet holes, with substantially no leakage flow of the lubricating oil through the spline-connected adjacent axial end portions, namely, without a substantial loss of the lubricating oil due to the leakage flow of the lubricating oil through the spline-connected adjacent axial end portions. Accordingly, all lubricated parts of the automatic transmission can be lubricated by a sufficient amount of lubricating oil, without having to form the first and second lubrication passages and the oil outlet holes with large cross sectional areas of flow of the lubricating oil. Further, the first and second rotary shafts need not be provided with a sealing device, which would undesirably increase the axial dimension and the number of components of the vehicular automatic transmission.

In one preferred form of the present invention, the vehicular automatic transmission further comprises a housing having a generally cylindrical housing open at opposite axial ends thereof, a thick-walled first end cover portion closing one of the opposite axial ends, and a thin-walled second end cover portion closing the other axial end, and wherein the first rotary shaft is rotatably supported by the first end cover portion, while the second rotary shaft is rotatably supported at one of opposite axial end portions thereof by the second end cover portion, and splined at the other of the opposite axial end portions to an axial end portion of the first rotary shaft which cooperates with the other axial end portion of the second rotary shaft to constitute the above-indicated splined-connected adjacent axial end portions. Further, the first oil inlet hole is held in communication with a first oil supply passage formed through the first end cover portion, while the second oil inlet hole is held in communication with a second oil supply passage formed through the second end cover portion. In this form of the invention, the first and second rotary shafts are rotatably supported by the respective first and second end cover portions of the housing, so that the two rotary shafts are rotated together, and the lubricated parts of the automatic transmission is lubricated with a sufficient amount of the lubricating oil delivered from the corresponding oil outlet holes which are located between the first and second oil inlet holes and the spline-connected adjacent axial end portions of the two rotary shafts.

BEST MODE FOR CARRYING OUT THE INVENTION

Figures 1, 2:
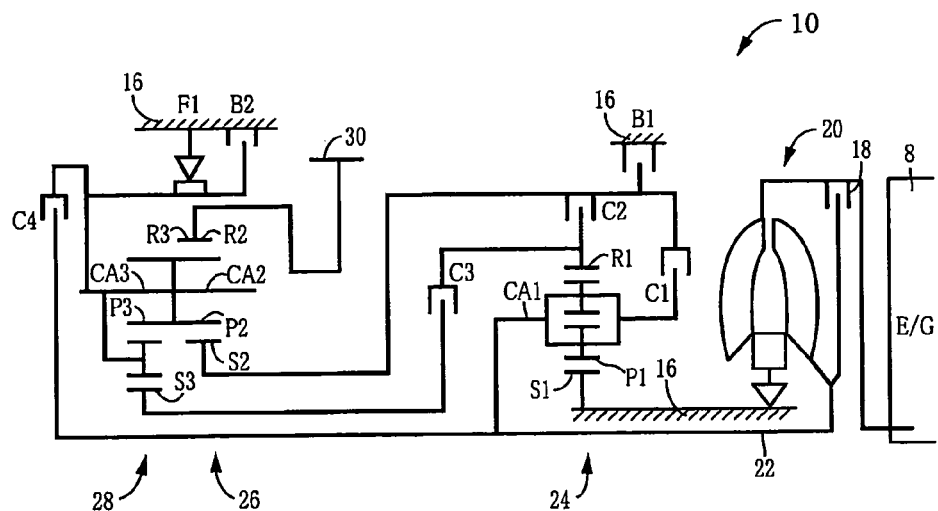
FIG. 1 is a schematic view of a vehicular automatic transmission constructed according to one embodiment of the present invention is applicable.
FIG. 2 is a view indicating combinations of frictional coupling clutches placed in their engaged states to establish respective operating positions (gear positions) of the automatic transmission of FIG. 1.

Referring first to the schematic view of FIG. 1, there is shown an automatic transmission 10 of a vehicle constructed according to one embodiment of this invention.

The automatic transmission 10 is disposed between an engine 8, and drive wheels (not shown) of the vehicle, and is constructed to transmit an output of the engine 8 to the drive wheels. The vehicle has a body to which there is fixed a stationary member in the form of housing 16. Within this housing 16, there are accommodated a torque converter 20 with a lockup clutch 18, an input shaft 22 connected to the torque converter 20, a first planetary gear set 24, a second planetary gear set 26, and a third planetary gear set 28, such that these major components 20, 22, 24, 26, 28 are arranged in the order of description in the left direction as seen in FIG. 1. The automatic transmission 10 has an output shaft 30 a rotary motion of which is transmitted to the drive wheels through a counter gear (not shown). Since the automatic transmission 10 is constructed symmetrically with respect to its axis, a lower half of the automatic transmission 10 is not shown in the schematic view of FIG. 1.

The first planetary gear set 24 is of a double-pinion type including a sun gear S1, a plurality of pairs of mutually meshing planetary gears P1, a carrier CA1 supporting the planetary gears P1, and a ring gear R1 meshing with the sun gear S1 through the planetary gears P1. The carrier CA1 supports the planetary gears P1 such that each planetary gear P1 is rotatable about its axis and such that the planetary gears P1 are rotatable about an axis of the automatic transmission 10.

A first clutch C1 is disposed between the first planetary gear set 24 and the torque converter 20, and a first brake B1 is disposed radially outwardly of the first clutch C1. Further, a second clutch C2 is disposed radially outwardly of the ring gear R1 of the first planetary gear set 24, and a third clutch C3 is disposed between the first planetary gear set 24 and the second planetary gear set 26.

Each of the second and third planetary gear sets 26, 28 is of a Ravingneaux type wherein the carrier and the ring gear are formed integrally with each other. The second planetary gear set 26 is of a single-pinion type including a sun gear S2, a planetary gear P2, a carrier CA2 and a ring gear R2 meshing with the sun gear S2 through the pinion gear P2. The carrier CA2 supports the pinion gear P2 such that the pinion gear P2 is rotatable about its axis and about the axis of the automatic transmission 10. The third planetary gear set 28 is of a double-pinion type including a sun gear S3, a plurality of pairs of mutually meshing pinion gears P3, a carrier CA3, and a ring gear R3 meshing with the sun gear S3 through the pinion gears P3. The carrier CA3 supports the pinion gears P3 such that each pinion gear P3 is rotatable about its axis and such that the pinion gears P3 are rotatable about the axis of the automatic transmission 10.

A second brake B2 and a one-way clutch F1 are disposed in parallel with each other, radially outwardly of the second planetary gear set 26 and the third planetary gear set 28, and a fourth clutch C4 is disposed on one of the opposite sides of the third planetary gear set 28 which is remote from the output shaft 30

In the first planetary gear set 24, the sun gear S1 is fixed to the stationary member in the form of the housing 16, and is held stationary, and the carrier CA1 is fixed directly to the input shaft 22 which receives the output of the torque converter 20. The carrier CA1 is selectively connected to the sun gear S2 of the second planetary gear set 26 through the first clutch C1, so that a rotary motion of the input shaft 22 is transmitted to the sun gear S2 of the second planetary gear set 26 without speed reduction while the first clutch C1 is placed in its engaged state. The ring gear R1 is always rotated at a constant speed reduction ratio, and is selectively connected to the sun gear S2 of the second planetary gear set 26 through the second clutch C2, and to the sun gear S3 of the third planetary gear set 28 through the third clutch C3, so that a rotary motion of the ring gear R1 rotating at the constant speed ratio is transmitted to the sun gear S2 of the second planetary gear set 26 while the second clutch C2 is placed in its engaged state, and to the sun gear S3 of the third planetary gear set 28 while the third clutch C3 is placed in its engaged state.

In the second planetary gear set 26, the sun gear S2 is fixed to the first planetary gear set 24, as described above, and the carrier CA2 is formed integrally with the carrier CA3 of the third planetary gear set 28, and is selectively connected to the input shaft 22 through the fourth clutch C4. The ring gear R2 is formed integrally with the ring gear R3 of the third planetary gear set 28, and is fixed to the output shaft 30. A rotary motion of the output shaft 30 is transmitted to the drive wheels through the counter gear described above.

In the third planetary gear set 28, the sun gear S3 is connectable through the third clutch C3 to the ring gear R1 of the first planetary gear set 24, as described above. The carrier CA3 has the same function as the carrier CA2 of the second planetary gear set 24, and the ring gear R3 operates in the same manner as the ring gear R2 of the second planetary gear set 26.

The rotary element connecting the first and second clutches C1, C2 and the sun gear S2 of the second planetary gear set 26 is fixed to the first brake B1, so that the sun gear S2 of the second planetary gear set 26 is held stationary while the first brake is placed in its engaged state. The one-way clutch F1 prevents a rotary motion of the carrier CA2 of the second planetary gear set 26 and the carrier CA3 of the third planetary gear set 28 as a unit. The second brake B2 disposed in parallel with the one-way clutch F1 selectively holds these carriers CA2, CA3 stationary.

The automatic transmission 10 constructed as described above is placed in a selected one of its operating positions "Rev1", "Rev2", "N", "$1^{st}$", "$2^{nd}$", "$3^{rd}$", "$4^{th}$", "$5^{th}$", "$6^{th}$", "$7^{th}$" and "$8^{th}$", when the corresponding one of eleven combinations of two frictional coupling devices selected from the clutches C1-C4, brakes B1, B2 and one-way clutch F1 is placed in the engaged state, as indicated in FIG. 2. In this figure, "O" represents the engaged state of each frictional coupling device.

Figure 3:
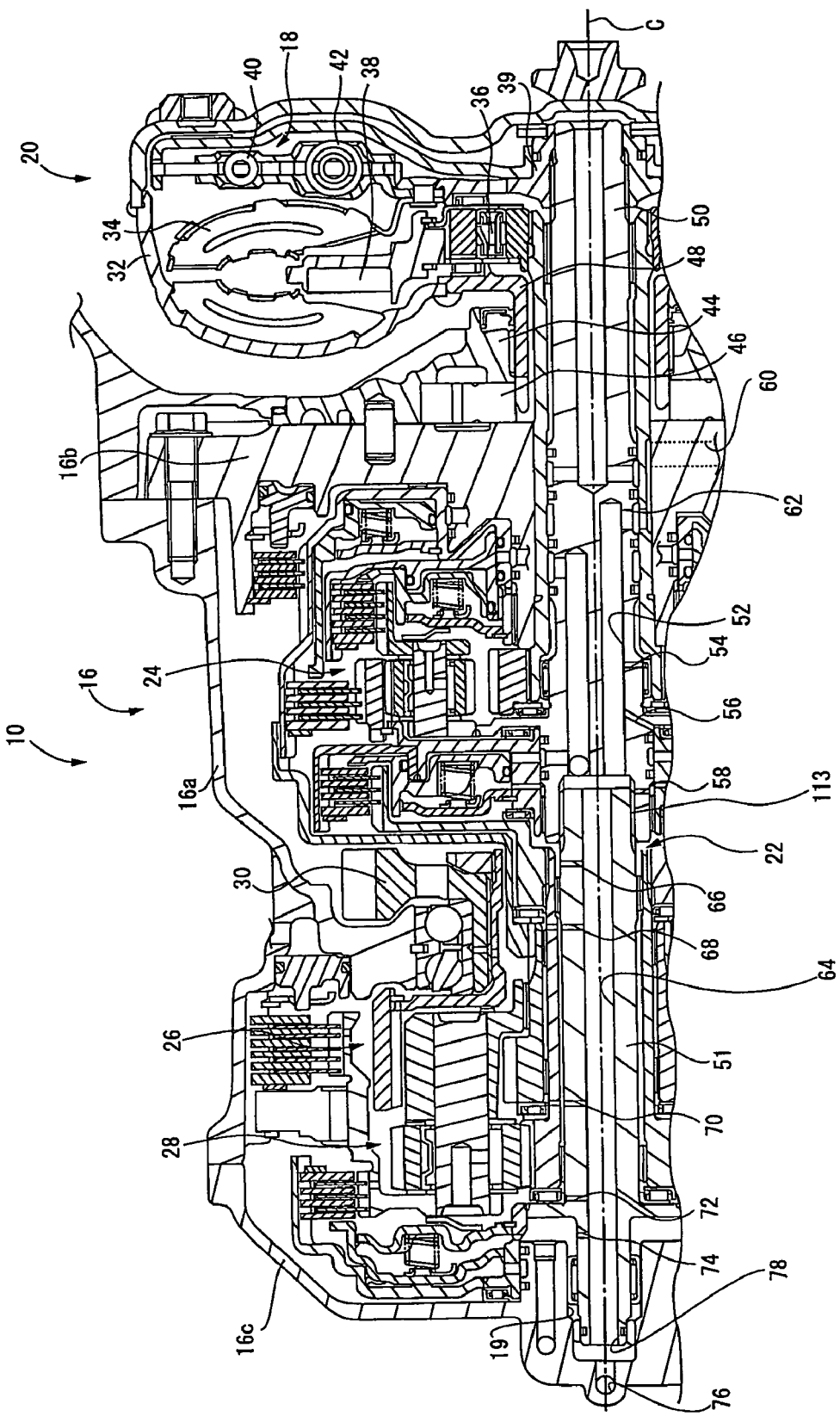
FIG. 3 is an elevational view in cross section showing in detail the construction of the automatic transmission of FIG. 1.

The automatic transmission 10 is shown in detail in the elevational view in cross section of FIG. 3, wherein the lower half of the automatic transmission is not shown, as in FIG. 1.

The housing 16 of the automatic transmission 10 accommodates the input shaft 22 rotatable about an axis C, the first through third planetary gear sets 24, 26, 28 also rotatable the axis C, and the plurality of frictional coupling devices in the form of the clutches C1-C4, brakes B1, B2 and one-way clutch F.

The housing 16 consists of three members in the form of a cylindrical portion 16a open at its opposite axial ends, a thick-walled first end cover portion in the form of a pump cover portion 16b closing one of the opposite axial ends of the cylindrical portion 16a, and a thin-walled second end cover portion 16c closing the other axial end of the cylindrical portion 16a. These three members 16a, 16b, 16c are fixed together into a unit by suitable fastening means such as a plurality of bolts.

The toque converter 20 includes a pump impeller 32 to which a rotary motion of the engine 8 is directly transmitted, a turbine impeller 34 disposed opposite to the pump impeller 32 and connected to the input shaft 22 of the automatic transmission 10, and a stator impeller 38 a rotary motion of which in one direction with respect to the turbine impeller 34 is inhibited by a one-way clutch 36 and which has a function of boosting a torque. The torque converter 20 transmits a torque through a working fluid filling a space between the pump impeller 32 and the turbine impeller 34. The torque converter 20 is provided with a lock-up clutch 18 having a first damper 40 and a second damper 42. When the lock-up clutch 18 is placed in its engaged state, a rotary motion of the pump impeller 32 is transmitted directly to the input shaft 22.

Between the pump cover portion 16b and a pump housing 44, there is disposed an oil pump 46 which includes a drive gear splined to a pump hub 48 fixed to the pump impeller 32.

The input shaft 22 is supported rotatably at one axial end portion thereof by a bearing disposed in a hole 19 formed in the second end cover portion 16c, and at the other axial end portion in a through-hole formed through the pump cover portion 16b.

The input shaft 22 consists of two rotary shafts in the form of a first shaft 50 and a second shaft 51 which are disposed coaxially with each other and rotated together and which are splined to each other at their adjacent axial end portions, which are referred to as "spline-connected or spline-coupled adjacent axial end portions 113". The first shaft 50 is splined to a turbine hub 39 which transmits a rotary motion of the torque converter 20 to the input shaft 22. The first shaft 50 is supported rotatably by the pump cover portion 16b. The second shaft 51 is supported rotatably at its axial end not splined to the first shaft 50, by the bearing disposed in the hole 19 formed in the second end cover portion 16c.

The first shaft 50 has a first lubrication passage 52 formed so as to extend in the axial direction, and further has a first group of oil outlet holes in the form of a first oil outlet hole 54, a second oil outlet hole 56 and a third oil outlet hole 58 which are spaced apart from each other in the axial direction in the order of description in the left direction as seen in FIG. 1 (in the axial direction from the torque converter 20 toward the second shaft 51). The oil outlet holes 54, 56, 58 of the first group extend from the first lubrication passage 52 in the radial direction of the first shaft 50, and are open in the outer circumferential surface of the first shaft 50, for feeding a lubricating oil to various lubricated parts of the automatic transmission 10.

The lubricating oil is introduced into the first lubrication passage 52 of the first shaft 50 through a first oil supply passage 60 (indicated by broken lines in FIG. 3) formed through the pump cover portion 16b and communicating with a suitable valve (not shown), and through a first oil inlet hole 62 having an annular cutout and communicating with the first lubrication passage 52 and the first oil supply passage 60. The lubricating oil is fed from the first lubrication passage 52 to the lubricated parts through the first, second and third oil outlet holes 54, 56, 58. The first oil outlet hole 54 which is nearest to the first oil inlet hole 62 is the most upstream oil outlet hole, while the third oil outlet hole 58 which is most distant from the first oil inlet hole 62 is the most downstream oil outlet hole.

The second shaft 51 has a second lubrication passage 64 formed so as to extend in the axial direction, and further has a second group of oil outlet holes in the form of a fourth oil outlet hole 66, a fifth oil outlet hole 68, a sixth oil outlet hole 70, seventh oil outlet hole 72 and an eighth oil outlet hole 74 which are arranged in a spaced-apart relationship in the axial direction in the order of description in the left direction as seen in FIG. 1 (in the axial direction from the axial end portion splined to the first shaft 50 to the other axial end portion). The oil outlet holes 66-74 of the second group extend from the second lubrication passage 64 in the radial direction of the second shaft 51, and are open in the outer circumferential surface of the second shaft 51.

The lubricating oil is introduced into the second lubrication passage 64 of the second shaft 51 through a second oil supply passage 76 formed through the second end cover portion 16c and communicating with the suitable valve (not shown), and through a second oil-inlet hole 78 formed through the axial end portion of the second shaft 51 not splined to the first shaft 50. The second oil inlet hole 78 is held in communication with the second oil supply passage 76. The lubricating oil is fed from the second lubrication passage 64 to the lubricated parts through the fourth through eighth oil outlet holes 66-74. The eighth oil outlet hole 74 which is nearest to the second oil inlet hole 76 is the most upstream oil outlet hole, while the fourth oil outlet hole 66 which is most distant from the second oil inlet hole 76 is the most downstream oil outlet hole.

The first planetary gear set 24 is disposed radially outwardly of the first shaft 50, while the second and third planetary gear sets 26, 28 which constitute a Ravigneaux type gear train are disposed radially outwardly of the second shaft 51.

Figure 4:
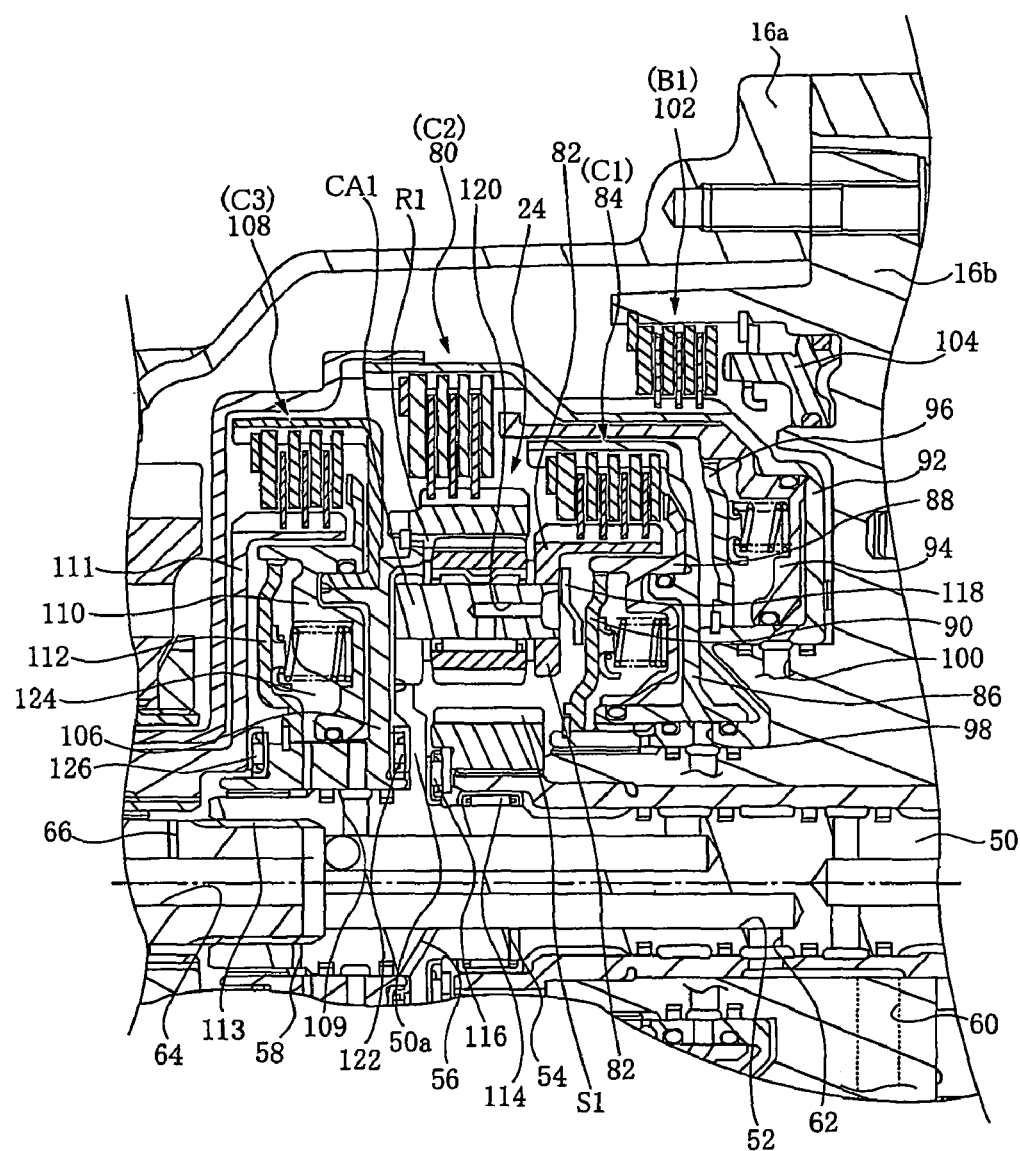
FIG. 4 is a fragmentary enlarged elevational view in cross section showing a portion of the automatic transmission of FIG. 1.
Figure 5:
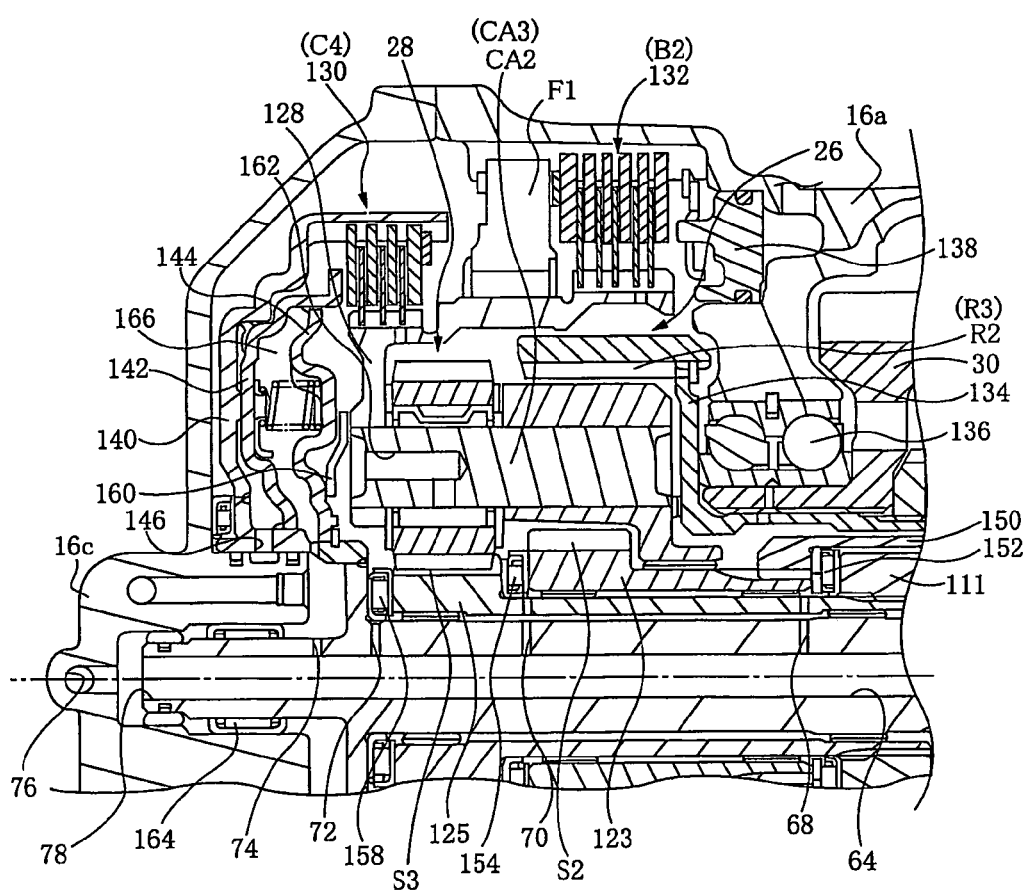
FIG. 5 is a fragmentary enlarged elevational view in cross section showing another portion of the automatic transmission of FIG. 1.

Referring to the fragmentary elevational view in cross section of FIG. 4, there is shown in detail a portion of the automatic transmission 10 in the vicinity of the first planetary gear set 24.

The sun gear S1 of the first planetary gear set 24 is splined to the stationary member in the form of the pump cover portion 16b, and is thus held stationary. The carrier CA1 s fixed to a flange portion 50a extending radially outwardly of the first shaft 50, and is thus rotated with the first shaft 50. The carrier CA1 is fixed to a first clutch hub 82. The ring gear R1 has a splined outer circumferential surface to which there are splined a plurality of first friction plates of second frictional coupling elements 80 of the second clutch C2.

The first clutch hub 82 has a splined outer circumferential surface to which there are splined a plurality of first friction plates of first frictional coupling elements 84 of the first clutch C1.

The first frictional coupling elements 84 consist of the first friction plates indicated above, and a plurality of second friction plates splined at their outer circumferential surfaces to a splined inner circumferential surface of a first drum 86 of the first clutch C1. Those first and second friction plates of the first frictional coupling elements 84 are alternately arranged such that each of the first friction plates is sandwiched between the adjacent two second friction plates.

The first clutch C1 includes, as its major components, the first frictional coupling elements 84, the first drum 86 accommodating and supporting the first frictional coupling elements 84, a first piston 88 axially slidably received in the first drum 86, a return spring biasing the first piston 88 in the axial direction toward the first drum 86, so as to prevent the first piston 88 from forcing the first frictional coupling elements 84, and a spring seat 90 on which the return spring is seated.

The second clutch C2 includes, as its major components, the second frictional coupling elements 80, a second drum 92 accommodating and supporting the second frictional coupling elements 80, a second piston 94 axially slidably received in the second drum 92, a return spring biasing the second piston 94 in the axial direction toward the second drum 92, so as to prevent the second piston 94 from forcing the second frictional coupling elements 80, and a spring seat 96 on which the return spring is seated.

The first drum 86 and the first piston 88 of the first clutch C1 define a first fluid chamber to which a pressurized working fluid is delivered from a first fluid supply hole 98 formed in the pump cover portion 16b, through a through-hole formed through the walls of the first drum 86 and the second drum 92. The first piston 88 is advanced by the pressurized working fluid supplied to the fluid chamber, so that the first frictional coupling elements 84 are forced against each other. The first drum 86 is provided with a retainer ring located adjacent to the friction plate of the first frictional coupling elements 84 which is most distant from the first piston 88. Since this retainer ring prevents an axial movement of the first frictional coupling elements 84 when the coupling elements 84 are forced against each other by the first piston 88, the first clutch C1 is placed in the engaged state.

The second drum 92 and the second piston 94 of the second clutch C2 define a second fluid chamber to which the pressurized working fluid is delivered from a second fluid supply hole 100 also formed in the pump cover portion 16b, through a through-hole formed through the walls of the second drum 92 and the second piston 94. The second piston 94 is advanced by the pressurized working fluid supplied to the fluid chamber, so that the second frictional coupling elements 80 are forced against each other. The second drum 92 is provided with a retainer ring located adjacent to the friction plate of the second frictional coupling elements 80 which is most distant from the second piston 94. Since this retainer ring prevents an axial movement of the second frictional coupling elements 80 when the coupling elements 80 are forced against each other by the second piston 94, the second clutch C2 is placed in its engaged state.

The second drum 92 has a splined outer circumferential surface to which there are splined first friction plates of third frictional coupling elements 102 of the first brake B1. The third frictional coupling elements 102 consist of these first friction plates, and second friction plates which are splined at their outer circumferential surfaces to a splined surface of the pump cover portion 16b. These first and second friction plates are alternately arranged such that each of the first friction plates is sandwiched between the adjacent two second friction plates.

The first brake B1 is brought into its engaged state when the third frictional coupling elements 102 are forced against each other by a first brake piston 104 axially slidably received in the pump cover portion 16b. The second drum 92 is held stationary while the first brake B1 is placed in the engaged state.

The third clutch C3 disposed between the first planetary gear set 24 and the second planetary gear set 26 is fitted on the first shaft 50 and fixed to the ring gear R1 of the first planetary gear set 24. The third clutch C3 includes, as its major components, a third drum 106 supporting fourth frictional coupling elements 108, a third piston 110 axially slidably received in the third drum 106 and axially movable to force the fourth frictional coupling elements 108 against each other, a second clutch hub 111 supporting first friction plates of the fourth frictional coupling elements 108 and arranged to transmit a rotary motion to the sun gear S3 of the third planetary gear set 28, a return spring biasing the third piston 110 in the axial direction toward the third drum 106, so as to prevent the third piston 110 from forcing the fourth frictional coupling elements 108 against each other, and a spring seat 112 on which the return spring is seated.

The third drum 106 and the third piston 110 of the third clutch C3 define a third fluid chamber to which the pressurized working fluid is delivered from a third fluid supply hole 109 formed in the first shaft 50, through a through-hole formed through the walls of the third drum 106 and the third piston 110. The third piston 110 is advanced by the pressurized working fluid supplied to the fluid chamber, so that the fourth frictional coupling elements 108 are forced against each other. The third drum 106 is provided with a retainer ring located adjacent to the friction plate of the fourth frictional coupling elements 108 which is most distant from the third piston 110. Since this retainer ring prevents an axial movement of the fourth frictional coupling elements 108 when the coupling elements 108 are forced against each other by the third piston 110, the third clutch C3 is placed in the engaged state.

Since the lubricating oil is introduced into the first lubrication passage 52 through the first oil inlet hole 62 formed through the first shaft 50, the lubricating oil flows through the first lubrication passage 52 in the axial direction from the first oil inlet hole 62 toward the axial end on the side of the second shaft 51. The lubricating oil fed out from the first lubrication passage 52 through the first oil outlet hole 54 flows to a bearing 114 and a thrust bearing 116. The bearing 114 which supports the first shaft 50 is disposed between the first shaft 50 and a portion of the pump cover portion 16b to which there is fixed the sun gear S1 of the first planetary gear set 24. The thrust bearing 116 which supports the flange portion 50a of the first shaft 50 is disposed between the sun gear S1 of the first planetary gear set 24 and the flange portion 50a. The lubricating oil is directed into a planetary gear lubricating passage 120, by an oil receiver plate 118 disposed between the carrier CA1 of the first planetary gear set 24 and the spring seat 90, so that the planetary gears P1 are lubricated with a comparatively large amount of the lubricating oil introduced into the planetary gear lubricating passage 120.

The lubricating oil fed out from the first lubrication passage 52 through the second oil outlet hole 56 flows to a thrust bearing 122 disposed between the flange portion 50a of the first shaft 50 and the third drum 106. The lubricating oil further flows through a gap between the first planetary gear set 24 and the third drum 106, to the ring gear R1 of the first planetary gear set 24, and then to the first frictional coupling elements 84 and the second frictional coupling elements 80.

The lubricating oil fed out from the first lubrication passage 52 through the third oil outlet hole 58 adjacent to the spline-connected adjacent axial end portions 113 of the first and second shafts 50, 51 is fed into a space formed between the third piston 110 and the spring seat 112, that is, into a so-called "centrifugal-pressure canceling chamber 124".

The lubricating oil fed out from the second lubrication passage 64 through the fourth oil outlet hole 66 is fed to lubricate a thrust bearing 126 disposed between the third drum 106 and the second clutch hub 111, and flows through a gap between the second clutch hub 111 and the spring seat 112 and a gap between the spring seat 112 and the third piston 110, to lubricate the fourth frictional coupling element 108.

The spline-connected adjacent axial end portions 113 of the first and second shafts 50, 51 has a gap between the mutually meshing spline teeth. The lubricating oil flowing through this gap, as well as the lubricating oil fed out through the fourth oil outlet hole 66, lubricates the thrust bearing 126. In the present embodiment, the input shaft 22 consisting of the first and second shafts 50, 51 need not be provided with a sealing device for preventing a flow of the lubricating oil through the gap existing between the spline teeth of the spline-connected axial end portions of the two shafts 50, 51, so that the required axial length of the input shaft 22 can be reduced in the absence of the sealing device.

The sun gear S2 of the second planetary gear set 26 and the sun gear S3 of the third planetary gear set 28 are respectively formed integrally with a first sun-gear member 123 and a second sun-gear member 125 which are rotatably supported by a plurality of thrust bearings and bushings. The common carrier CA2, CA3 is fixed to a third clutch hub 128. This third clutch hub 128 has a splined outer circumferential surface to which there are splined first friction plates of fifth frictional coupling elements 130 of the fourth clutch C4 and first friction plates of sixth frictional coupling elements 132 of the second brake B2. The third clutch hub 128 is provided with the one-way clutch F1. The common ring gear R2, R3 is fixed to a fourth clutch hub 134 to which there is splined a bearing 136 supporting the output shaft 30, so that a rotary motion of the common ring gear R2, R3 is transmitted.

The sixth frictional coupling elements 132 of the second brake B2 consist of the first friction plates splined to the splined outer circumferential surface of the third clutch hub 128 indicated above, and second friction plates splined to a splined inner circumferential surface of the cylindrical portion 16*a* of the housing 16. These sixth frictional coupling elements 132 are forced against each other by a second brake piston 138 axially slidably received in the cylindrical portion 16*a*, so that the second brake B2 is brought into its engaged state.

The fourth clutch C4, which is disposed between the third planetary gear set 28 and the second end cover portion 16*c*, includes as its major components: the fifth frictional coupling elements 130; a fourth drum 140 rotatably fitted on the second end cover portion 16*c* and having a splined inner circumferential surface to which there are splined second friction plates of the fifth frictional coupling elements 130; a fourth piston 142 axially slidably received in the fourth drum 140 and axially movable to force the fifth frictional coupling elements 130 against each other; a return spring biasing the fourth piston 142 in the axial direction toward the fourth drum 140, so as to prevent the fourth piston 142 from forcing the fifth frictional coupling elements 130; and a spring seat 144 on which the return spring is seated.

The fourth drum 140 and the fourth piston 142 of the fourth clutch C4 define a fourth fluid chamber to which the pressurized working fluid is delivered from a fourth fluid supply hole 146 formed in the second end cover portion 16*c*, through a through-hole formed through the fourth drum 140. The fourth piston 142 is advanced by the pressurized working fluid supplied to the fluid chamber, so that the fifth frictional coupling elements 130 are forced against each other. The fourth drum 140 is provided with a retainer ring located adjacent to the friction plate of the fifth frictional coupling elements 130 which is most distant from the fourth piston 142. Since this retainer ring prevents an axial movement of the fifth frictional coupling elements 130 when the coupling elements 130 are forced against each other by the fourth piston 142, the fourth clutch C4 is placed in the engaged state.

The lubricating oil fed out from the second lubrication passage 64 through the fifth oil outlet hole 68 lubricates a thrust bearing 152 disposed between the second clutch hub 111 and a connecting member 150 which is splined to the first sun-gear member 123 and disposed between the first sun-gear member 123 and the second drum 92 (shown in FIG. 4). Then, the lubricating oil flows through a gap between the spline teeth of the first sun gear member 123 and the connecting member 150, and a through-hole formed through the fourth clutch hub 134 and the output shaft 30, to lubricate the bearing 136 supporting the output shaft 30.

The lubricating oil fed out from the second lubrication passage 64 through the sixth oil outlet hole 70 lubricates a thrust bearing 154 disposed between the first sun-gear member 123 and the second sun-gear member 125, and further lubricates the second and third planetary gear sets 26, 28.

The lubricating oil fed out from the second lubrication passage through the seventh oil outlet hole 72 lubricates a thrust bearing 158 disposed between the second shaft 51 and the second sun-gear member 125, and is directed into a planetary gear lubricating passage 162, by an oil receiver plate 160 disposed between the spring seat 144 and the third planetary gear set 28, so that the planetary gears P1, P2 are lubricated with a comparatively large amount of the lubricating oil introduced into the planetary gear lubricating passage 162.

The lubricating oil fed out from the second lubrication passage 64 through the eighth oil outlet hole 74 lubricates a bearing 164 supporting the second shaft 51, and flows through a through-hole formed through the fourth drum 140, into a space formed between the fourth piston 142 and the spring seat 144, that is, into a so-called "centrifugal-pressure canceling chamber 166".

If the lubricating oil was delivered through only the second oil inlet hole 78 to the various oil outlet holes 54, 56, 58, 66, 68, 70, 72, 74 in the vehicular automatic transmission 10 shown in FIG. 3, a sufficient amount of lubricating oil could be delivered to the fourth through eighth oil outlet holes 66-74, but could not be delivered to the first through third oil outlet holes 54, 56, 58 located downstream of the spline-connected adjacent axial portions 113, due to a leakage flow of the lubricating oil through the gap between the mutually meshing spline teeth of the spline-connected adjacent axial end portions 113. If the lubricating oil was delivered through only the first oil inlet hole 62 formed through the first shaft 50, a sufficient amount of lubricating oil could be delivered to the first through third oil outlet holes 54, 56, 58, but could not be delivered to the fourth through eighth oil outlet holes 66-74 located downstream of the spline-connected adjacent axial portions 113, due to a leakage flow of the lubricating oil through the gap between the spline teeth of the spline-connected adjacent axial end portions 113. In the present automatic transmission 10, there are provided the two oil inlet holes 62, 78 so that the lubricating oil introduced through the first oil inlet hole 62 into the first lubrication passage 52 formed through the first shaft 50 is delivered to the first, second and third oil outlet holes 54, 56, 58, while the lubricating oil introduced through the second oil inlet hole 78 into the second lubrication passage 64 formed through the second shaft 51 is delivered to the fourth through eighth oil outlet holes 66-74, whereby all of the lubricated parts of the automatic transmission 10 can be lubricated by the lubricating oil delivered from the corresponding oil outlet holes 66-74, with substantially no leakage flow of the lubricating oil through the spline-connected adjacent axial end portions 113, namely, without a substantial loss of the lubricating oil due to the leakage flow of the lubricating oil through the spline-connected adjacent axial end portions 113.

As described above, the present automatic transmission 10 is arranged such that the lubricating oil is delivered from the first oil inlet hole 78 formed through the first shaft 50 and the second oil inlet hole 78 formed through the second shaft 51, toward the spline-connected axial end portions 113 of the two shafts 50, 51, so that the lubricated parts of the automatic transmission 10 can be lubricated by the lubricating oil fed through the various oil outlet holes 54-58, 66-74 formed through the first and second shafts 50, 51. Further, the amount of leakage flow of the lubricating oil through the spline-connected adjacent axial end portions 113 can be reduced, since the spline-connected adjacent axial end portions 113 are located downstream of the first and second oil inlet holes 62, 78.

The present embodiment is further advantageous in that no sealing device is required for preventing the leakage flow of the lubricating oil through the spline-connected adjacent axial end portions 113 of the two shafts 50, 51, so that the required axial dimension of the automatic transmission 10 can be reduced.

The present embodiment is further arranged such that the first oil supply passage 60 communicating with the first oil inlet hole 62 is formed through the pump cover portion 16b by which the first shaft 50 is rotatably supported, while the second oil supply passage 76 communicating with the second oil inlet hole 78 is formed through the second end cover portion 16c by which the second shaft 51 is rotatably supported via the bearing device. This arrangement permits a sufficient amount of supply of the lubricating oil to the lubricated parts of the automatic transmission 10, without increasing the size of the automatic transmission 10.

While the preferred embodiment of the automatic transmission of the present invention has been described above in detail by reference to the accompanying drawings, it is to (be understood that the present invention is not limited to the details of the illustrated embodiment, but may be otherwise embodied.

In the illustrated embodiment, the vehicular automatic transmission 10 has a reduced axial dimension in the absence of a sealing device for preventing the leakage flow of the lubricating oil through the gap between the spline teeth of the spline-connected adjacent axial end portions 113 at which the first and second shafts 50, 51 are splined to each other. However, the spline-connected adjacent axial end portions 113 may be provided with a suitable sealing device.

Although the second oil supply hole 78 is formed at the axial end portion of the second shaft 51 remote from the spline-connected axial end portions 113, the second oil supply hole may be formed at an axially intermediate portion of the second shaft 51.

It is to be understood that the present invention may be embodied with various other changes and modifications which may occur to those skilled in the art.

The invention claimed is:

1. A vehicular automatic transmission comprising:
   a first rotary shaft and a second rotary shaft which are coaxial with each other and which are splined to each other at their adjacent axial end portions to be rotated together;
   a lubrication system including:
      a first lubrication passage and a second lubrication passage which are respectively formed through said first and second rotary shaft so as to extend in an axial direction of the rotary shafts and which are held in communication with each other through said adjacent axial end portions;
      a plurality of oil outlet holes which are held in communication with said first and second lubrication passages and which are spaced apart from each other in said axial direction, so that a lubricating oil introduced into said first and second lubrication passages is delivered through said oil outlet holes radially outwardly of said first and second shafts, to corresponding lubricated parts of the automatic transmission; and
      a first oil inlet hole and a second oil inlet hole formed through said first and second rotary shafts, respectively, such that said plurality of oil outlet holes are located between said first and second oil inlet holes and said adjacent axial end portions of said first and second rotary shafts, so that the lubricating oil introduced into said first and second lubrication passages through said first and second oil inlet holes, respectively, flows through said first and second lubrication passages toward said adjacent axial end portions.

2. The vehicular automatic transmission according to claim 1, further comprising:
   a housing having a generally cylindrical housing portion open at opposite axial ends thereof, a thick-walled first end cover portion closing one of said opposite axial ends, and a thin-walled second end cover portion closing the other axial end,
   wherein said first rotary shaft is rotatably supported by said first end cover portion, while said second rotary shaft is rotatably supported at one of opposite axial end portions thereof by said second end cover portion, and splined at the other of said opposite axial end portions to an axial end portion of said first rotary shaft which cooperates with said other axial end portion of said second rotary shaft to constitute said splined-connected adjacent axial end portions,
   said first oil inlet hole being held in communication with a first oil supply passage formed through said first end cover portion, while said second oil inlet hole being held in communication with a second oil supply passage formed through said second end cover portion.

3. The vehicular automatic transmission according to claim 1, wherein said plurality of oil outlet holes consist of a first group of oil outlet holes located between said first oil inlet hole and said splined-connected adjacent axial end portions of said first and second rotary shafts, and a second group of oil outlet holes located between said second oil inlet hole and said spline-connected adjacent axial end portions.

4. The vehicular automatic transmission according to claim 3, wherein said first group of oil outlet holes consists of three oil outlet holes, while said second group of oil outlet holes consists of five oil outlet holes.

5. The vehicular automatic transmission according to claim 2, further comprising a first clutch having a first drum and a first piston which cooperate to define a first fluid chamber therebetween, and wherein said first end cover portion of said housing has a first fluid supply hole formed therethrough to deliver a pressurized working fluid to said first fluid chamber.

6. The vehicular automatic transmission according to claim 2, further comprising a second clutch having a second drum and a second piston which cooperate to define a second fluid chamber therebetween, and wherein said first end cover portion of said housing has a second fluid supply hole formed therethrough to deliver a pressurized working fluid to said second fluid chamber.

7. The vehicular automatic transmission according to claim 2, further comprising a third clutch having a third drum and a third piston which cooperate to define a third fluid chamber therebetween, and wherein said first rotary shaft has a third fluid supply hole formed therethrough to deliver a pressurized working fluid to said third fluid chamber.

8. The vehicular automatic transmission according to claim 2, further comprising a fourth clutch having a fourth drum and a fourth piston which cooperate to define a fourth fluid chamber therebetween, and wherein said second end cover portion of said housing has a fourth fluid supply hole formed therethrough to deliver a pressurized working fluid to said fourth fluid chamber.

* * * * *